United States Patent [19]

Pettijohn et al.

[11] Patent Number: 5,102,840

[45] Date of Patent: Apr. 7, 1992

[54] OLEFIN POLYMERIZATION

[75] Inventors: Ted M. Pettijohn; Henry L. Hsieh, both of Bartlesville, Okla.

[73] Assignee: Phillips Petroleum Company, Bartlesville, Okla.

[21] Appl. No.: 664,238

[22] Filed: Mar. 4, 1991

Related U.S. Application Data

[62] Division of Ser. No. 536,383, Jun. 11, 1990, Pat. No. 5,028,673.

[51] Int. Cl.$^5$ .................. C08F 4/643; C08F 4/646
[52] U.S. Cl. .................. 502/103; 526/159
[58] Field of Search .......................... 502/103

[56] References Cited

U.S. PATENT DOCUMENTS

| | | | |
|---|---|---|---|
| 3,051,690 | 8/1962 | Vandenberg | 526/159 X |
| 3,231,515 | 1/1966 | Ziegler et al. | 502/103 X |
| 3,579,493 | 5/1971 | Ziegler et al. | 502/103 X |

Primary Examiner—Patrick P. Garvin
Attorney, Agent, or Firm—Edward L. Bowman

[57] ABSTRACT

High activity olefin polymerization catalysts based on organolithium compounds and transition metal compounds are disclosed. In one catalyst system an organolithium compound is employed in combination with titanium tetrachloride and the Li/Ti ratio is in the range of about 20 to about 50. In another catalyst system the organo lithium compound is combined with a rare earth metal halide. For best results these catalyst systems are employed at pressures of at least about 100 psi. In ethylene polymerization an ethylene partial pressure of at least about 100 psi is preferred.

9 Claims, 3 Drawing Sheets

OLEFIN POLYMERIZATION

This application is a division of application Ser. No. 07/536,383, now U.S. Pat. No. 5,028,673.

FIELD OF THE INVENTION

The present invention relates to the polymerization of olefins. In another aspect the present invention relates to catalyst systems useful for the polymerization of olefins.

BACKGROUND OF THE INVENTION

A number of catalysts have been found for the polymerization of olefins. Some of the earliest catalysts of this type resulted from the combination of certain transition metal compounds with organometallic compounds of Groups I, II, and III of the Periodic Table. Due to the extensive amounts of early work done by certain research groups many of the catalysts of that type came to be referred to by those skilled in the area as Ziegler-Natta type catalysts.

The most commercially successful of the so-called Ziegler-Natta catalysts have heretofore generally been those employing a combination of a transition metal compound and an organoaluminum compound.

The literature shows that some work was done using Group I metal alkyls in combination with a transition metal compound. Friedlander and Oita in *Ind. and Eng. Chem.* 49, 1855 (1957), disclosed the polymerization of ethylene using n-butyl lithium and titanium tetrachloride. They reported that the activity of the catalyst was very dependent upon the ratio of Li to Ti and upon whether or not the two catalyst components were mixed in the presence or absence of the monomer. When the catalyst was formed in the presence of ethylene, a peak in productivity of about 850 grams of polyethylene per gram of Ti was observed when the Li to Ti gram atom ratio was about 4.5. At higher Li to Ti ratios the activity was observed to drop to a value of about 400 grams of polyethylene per gram of Ti. If the catalyst was formed in the absence of ethylene, virtually no activity was observed except at Li to Ti gram atom ratios of about 1.5, and even then the productivity was only about 190 grams of polyethylene per gram of Ti.

Frankel, Rabani, and Zilkha in *J. Poly. Sci.*, 28, 387 (1958), reported some additional work on alkyl lithium/titanium tetrachloride polymerization catalysts. They also noted that the activity was affected by the Li/Ti ratio. They observed that peak activity of about 70 grams of polyethylene per gram of titanium occurred at Li to Ti gram atom ratio between about 2 and about 2.5 for catalyst prepared from n-butyl lithium in the absence of ethylene. Frankel et al used pressures in the range of atmospheric to about 70 psi. Higher pressures resulted in a somewhat increased polymer yield; however, the increase of the pressure range from about 40 to 50 psi to about 60 to 70 psi did not provide any significant increase in polymer yield.

The polymerization activities reported for those alkyl lithium/titanium tetrachloride catalyst systems were much lower than those of the organoaluminum/titanium tetrachloride catalysts. Perhaps for that reason little work has been done on such catalysts since that time.

It is known that even butyl lithium alone can result in some polymerization of ethylene; however, when used alone it is not considered that it would produce any significant amount of solid polymer. U.S. Pat. No. 3,429,864 discloses that the combination of alkyl lithium and a rare earth metal halide is suitable for the production of solid polyethylene; however, even here the activity of such alkyl lithium catalysts were much lower than the Zeigler-Natta type catalysts prepared from a combination of a transition metal compound and an organoaluminum compound.

An object of the present invention is to provide improved alkali metal based polymerization catalyst systems.

Another object of the present invention is to provide new and improved methods for polymerizing olefins.

Other objects, aspects, and advantages of the present invention will be apparent to those skilled in the art upon reading the following disclosure.

SUMMARY OF THE INVENTION

In accordance with one aspect of the present invention there is provided a first type of olefin polymerization catalyst resulting from the combination of titanium tetrachloride and an organolithium compound, wherein the gram atom ratio of the lithium to the titanium is in the range of about 20 to 1 to about 50 to 1.

In accordance with another aspect of the present invention there is provided a process for polymerizing an olefin comprising contacting the olefin under polymerization conditions with this first type of inventive catalyst system. In a particularly preferred embodiment ethylene is polymerized in the presence of an inventive Li/Ti catalyst system at an ethylene pressure of at least about 100 psig.

In accordance with still another aspect of the present invention there is provided a second type of olefin polymerization catalyst resulting from the combination of a rare earth metal halide, an organolithium compound, and a transition metal compound. In a particularly preferred embodiment of the second type of polymerization catalyst the catalyst results from the combination of a rare earth metal halide, an organolithium compound, and titanium tetrachloride.

In accordance with another aspect of the present invention there is provided a process for polymerizing an olefin comprising contacting the olefin under polymerization conditions with this second type of inventive catalyst system. In a particularly preferred embodiment ethylene is polymerized in the presence of the inventive rare earth-containing catalyst system at an ethylene pressure of at least about 100 psig.

DETAILED DESCRIPTION OF THE INVENTION

First Inventive Catalyst

Figure 1:
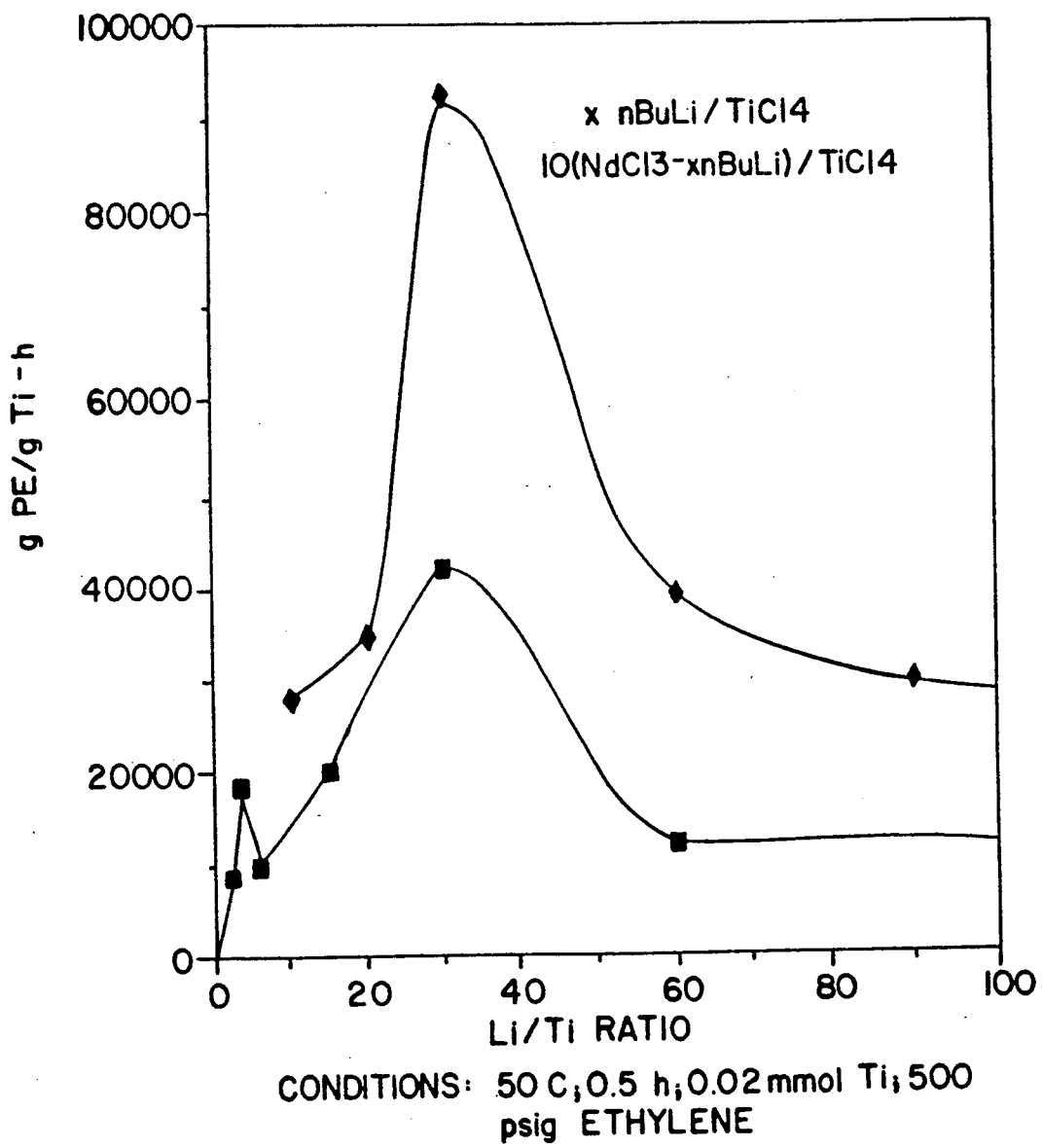

The first inventive catalyst system is prepared by combining an organolithium and titanium tetrachloride in a suitable diluent. The diluent can be any normally liquid material that does not interfere with the polymerization activity of the catalyst system. Typical diluents would include hydrocarbons. Typical examples of such hydrocarbons include pentane, heptane, hexane, cyclohexane, octane, benzene, xylene, toluene, and the like. As a general rule tetrahydrofuran should not be employed, as it has been found to have an adverse effect upon the catalyst system.

The organolithium employed in making the first inventive catalyst system can be selected from any suitable organolithium. Currently, lithium alkyls are preferred. Generally a lithium alkyl having 2 to 6 carbon atoms per alkyl group would be used. The currently preferred alkyl lithiums are the butyl lithiums, with tert-butyl lithium being most preferred, followed by n-butyl lithium, and then sec-butyl lithium.

The contacting of the organolithium and the titanium tetrachloride can be carried out at any suitabe temperature. Generally, they would be contacted in the suitable diluent at a temperature in the range of about 10° C. to about 100° C., most preferably about normal ambient temperature, i.e. in the range of about 15° C. to about 25° C. The contacting is preferably done under an inert atmosphere and the catalyst is preferably used soon after preparation.

The relative amounts of titanium tetrachloride and organolithium can vary over a relatively broad range; however, for optimum results the gram atom ratio of the lithium to the titanium would be in the range of about 20/1 to about 100/1, more preferably about 20/1 to 35/1.

It is considered that the catalyst is suitable for the polymerization of any olefin that is polymerizable with a so-called Zeigler-Natta type polymerization catalyst. Examples of such olefins include ethylene, propylene, 4-methyl-1-pentene, butene-1, hexene-1, and the like. Copolymerization of two or more alpha olefins or of an alpha olefin and a diene is also contemplated. Examples of typical dienes include 1,4-hexadiene, ethyldiennorbornene, and dicyclopentadiene.

The first type of inventive catalyst system can be used to polymerize olefins using the same type of coditions often used in the polymerizations using the so-called Ziegler-Natta catalysts. The best results have been noted when the polymerization is conducted under an ethylene partial pressure of at least 100 psig, still more preferably at least about 500 psig. The employment of hydrogen during the polymerization appears to have an adverse effect upon the activity of the catalyst. Preferably ethylene partial pressures of 100–1000 psi are used. Higher reaction pressures, such as 5000 to 10,000 could be employed but the additional expense of the required equipment generally outweighs the benefits obtained.

In the polymerization of ethylene, a reaction temperature in the range of about 40° C. to about 250° C. is preferred. A reaction temperature in the range of about 50° C. to about 100° C. and an ethylene partial pressure of about 200 to about 600 psi will give good results.

Second Inventive Catalyst

The second type of inventive catalyst is prepared by contacting reactants consisting essentially of a rare earth metal halide, an organolithium compound, and a transition metal compound selected from dicyclopentadienyl zirconium dichloride and titanium compounds of the formula TiX4 wherein each X is individually selected from the group consisting of halogen, alkyl, alkoxy, and aryl radicals.

Some typical examples of such titanium compounds include titanium tetrachloride, titanium tetrabromide, titanium tetraiodide, monomethoxytrichlorotitanium, dimethoxy dichlorotitanium, trimethoxy monochloro titanium, tetramethoxy titanium, tetraethoxy titanium, triethoxy monochloro titanium, mono isopropoxy trichloro titanium, monophenoxytrichlorotitanium, and the like. Preferably the hydrocarbyl groups on the titanium compound have 1 to 6 carbons.

The organolithium compounds employed are selected from the same type as described above for the first inventive catalyst. The currently preferred organolithiums are the alkyl lithiums, with n-butyl lithium being the currently most preferred.

The term rare earth metal as used herein refers to those rare earth elements having atomic numbers of 57–71 inclusive. Some typical examples of rare earth metal halides that are contemplated for use in this invention include neodymium chloride, cerous iodide, lanthanum bromide, lanthanum chloride, lanthanum iodide, cerous chloride, praseodymium bromide, praseodymium chloride, neodymium bromide, neodymium iodide, promethium chloride, samarium tribromide, samarium trichloride, europium chloride, gadolinium bromide, gadolinium chloride, terbium chloride, dysprosium chloride, holmium chloride, thulium chloride, yetterbium chloride, lutetium chloride, lanthanum oxybromide, lanthanum oxychloride, cerous oxychloride, ceric oxychloride, neodymium oxychloride, neodymium oxybromide, and the like.

It is also within the scope of the present invention to employ such halides in combination with rare earth metal oxides. Some examples of such rare earth metal oxides include cerous oxide, neodymium oxide, lanthanum oxide, and the like. Mixtures of two or more rare earth metal halides or of various rare earth metal halides and rare earth metal oxides can be employed. Some typical examples of such mixtures include NdCl3 with Nd2O3, NdCl3 with Nd2O3 and CeO2, NdCl3 with CeO2, and the like.

In preparing the second type of inventive catalyst it is preferred to first contact the organolithium compound and the rare earth metal halide in a suitable liquid diluent. The diluent can be of the same type as described above for use in preparing the first type of inventive catalyst. Generally, the organolithium and the rare earth metal compound would be contacted in the suitable diluent at a temperature in the range of about 10° C. to about 100° C., most preferably about normal ambient temperature, i.e. in the range of about 15° C. to about 25° C. The contacting is preferably done under an inert atmosphere.

After the organolithium compound and the rare earth metal compound have been contacted the transition metal compound is added to the resulting liquid composition. The temperature conditions would be in the same general range as disclosed above for the contacting of the rare earth metal halide and the lithium compound. Also the formation of the catalyst would preferably be conducted under an inert atmosphere. The resulting catalyst would then preferably be used soon after preparation.

The relative amounts of the rare earth metal halide and the organolithium can vary over a relatively broad range; however, for optimum results the gram atom ratio of the lithium to the rare earth metal would be in the range of from about 1/1 to about 30/1, more preferably about 3/1 to about 6/1. The relative amounts of the lithium to the titanium would generally be in the range of about 1/1 to about 300/1, more preferably in the range of about 20/1 to about 50/1, and still more preferably about 20/1 to 35/1.

It is considered that the second inventive type of catalyst is suitable for the polymerization of any olefin that is polymerizable with a so-called Zeigler-Natta type polymerization catalyst. Examples of such olefins include ethylene, propylene, 4-methyl-1-pentene, butene-1, hexene-1, and the like. Copolymerization of two or more alpha olefins or of an alpha olefin and a diene is also contemplated. Examples of typical dienes include 1,4-hexadiene, and dicyclopentadiene.

The first type of inventive catalyst system can be used to polymerize olefins using the same type of conditions often used in the polymerizations using the so-called Ziegler-Natta catalysts. The best results have been noted when the polymerization is conducted under an ethylene partial pressure of at least 100 psig, still more preferably at least about 500 psig. The employment of hydrogen during the polymerization appears to have an adverse effect upon the activity of the catalyst. Preferably ethylene partial pressures of 100–1000 psi are used. Higher reaction pressures, such as 5000 to 10,000 could be employed but the additional expense of the required equipment generally outweighs the benefits obtained.

In the polymerization of ethylene, a reaction temperature in the range of about 40° C. to about 250° C. is preferred. A reaction temperature in the range of about 50° C. to about 100° C. and an ethylene partial pressure of about 200 to about 600 psi will give good results.

A further understanding of the present invention and its various aspects and advantages will be provided by the following examples.

In carrying out the experiments set forth in the following examples, the reagents were of the highest purity available. Common solvents were degassed and then either dried by storage over molecular sieves or over active metal followed by distillation under reduced pressure. The rare earth containing catalysts were prepared in an argon atmosphere drybox by weighing the anhydrous solid into a small pressure tube. The tube was sealed using a perforated crown cap over a self-sealing gasket that had been extracted with toluene. Outside the box, solvent and other reagents were added via a syringe. Unless indicated otherwise the resulting mixture was then maintained at room temperature for approximately 16 hours.

A typical example of the preparation of one of the inventive rare earth metal containing catalysts would be as follows: anhydrous $NdCl_3$ in the amount of 0.25 grams was weighted into a 25 milliliter pressure tube. The solid was then suspended in 5 milliliters of toluene and 3.0 millimoles of n-butyl lithium was added in the form of a 2.5 molar solution in hexane. The mixture was place on a continuous shaker and agitated for a period of 16 hours. At the end of the reaction time a dark brown solution with a brown-black solid resulted. Then 11 microliters of titanium tetrachloride was added to the reaction mixture. A dark brown solid formed immediately. The mixture was shaken to homogenize it as much as possible and an aliquot of the catalyst solution was charged to the polymerization reactor no more than about 3 minutes after the addition of the titanium tetrachloride.

Catalysts that did not contain a rare earth halide were prepared in a similar manner, namely, an argon filled pressure tube was removed from the drybox, charged with solvent, alkyllithium, and titanium tetrachloride in that order unless indicated differently.

Unless indicated differently in the following examples, the polymerization reactions were carried out in a one-liter stirred autoclave. All reactions were run at 50° C. unless otherwise specified. Prior to the reactions the autoclave was washed thoroughly with dry cyclohexane and purged with nitrogen. 500 milliliters of the polymerization reaction solvent was added to the reactor and the temperature maintained at 50° C. Then an aliquot of the catalyst solution was charged under a counterflow of ethylene through a small port. The reactor was sealed and the ethylene pressure increased. At the end of the reaction, the solvent and ethylene were rapidly vented and the solid polymer was collected and dried. In many of the following examples, the catalyst activity is set forth as kilograms PE/gram Ti.H. It should be noted that most of the reactions were of 0.5 hour or less. The activities specified are however scaled to one hour based upon the results obtained for the actual time of polymerization.

EXAMPLE I

A series of runs were carried out to evaluate the effectiveness of an alkyl lithium/titanium tetrachloride mixture in the polymerization of ethylene. The catalysts were prepared by charging a sealed tube with solvent, alkyl lithium, and titanium in that order. Catalysts having lithium/titanium gram:atom ratios in the range of 1:1 to 60:1 were prepared. These catalysts were then evaluated for their activity in the polymerization of ethylene at 50° C. and 500 psig ethylene. Some of the results of these tests are summarized in Table I. Other results are also summarized in FIG. 1.

TABLE I

| Run | Li/Ti* | mmol Ti | Time | Yield (gram) | Kg PE/g Ti/hr |
|---|---|---|---|---|---|
| 1 | 1 | 0.2 | 0.50 | 0 | 0 |
| 2 | 2 | 0.4 | 0.50 | 0 | 0 |
| 3 | 3 | 0.6 | 0.50 | 39.03 | 8.2 |
| 4 | 4 | 0.8 | 0.50 | 84.80 | 18 |
| 5 | 6 | 1.2 | 0.25 | 23.03 | 9.6 |
| 6 | 15 | 0.3 | 0.50 | 9.57 | 20 |
| 7 | 30 | 0.6 | 0.08 | 8.71 | 110 |
| 8 | 30 | 0.6 | 0.25 | 12.91 | 54 |
| 9 | 30 | 0.6 | 0.50 | 20.31 | 42 |
| 10 | 30 | 0.6 | 1.0 | 35.74 | 37 |
| 11 | 90 | 1.8 | 0.50 | 9.90 | 21 |
| 12 | 300 | 6.0 | 0.50 | 7.61 | 16 |

As shown by the lower curve in FIG. 1 in the lithium/titanium gram:atom ratio range of 1:1 to 5:1, a peak in the activity occurs at a lithium to titanium ratio of about 4. Notably, however, in the lithium/titanium gram atom ratio range of about 20:1 to about 60:1 a much higher peak in activity occurs at a lithium to titanium ratio of about 30. FIG. 1 and Table I show that the use of a lithium/titanium ratio of about 30 often gave more than twice the activity of the lithium/titanium gram:atom ratio of 4.

EXAMPLE II

Another series of runs were prepared in this case using a rare earth metal halide, namely $NdCl_3$ in addition to n-butyl lithium and titanium tetrachloride. In this series of runs the ratio of the rare earth metal halide to the titanium tetrachloride was 1:1 and the ratio of lithium alkyl to the rare earth metal halide was varied. The variable employed in these experiments and the results obtained are summarized in Table II.

TABLE II

| Run | mmol Ti | Li/Nd | Time (hr) | Yield (gm) | Kg PE/g Ti/hr |
|---|---|---|---|---|---|
| 13 | 0.25 | 1 | 0.25 | 1.03 | 0.34 |
| 14 | 0.25 | 2 | 0.25 | 12.13 | 4.1 |
| 15 | 0.25 | 3 | 0.25 | 34.54 | 12 |
| 16 | 0.25 | 6 | 0.25 | 116.30 | 39 |
| 17 | 0.25 | 30 | 0.25 | 52.10 | 17 |

Table II shows that when the rare earth metal halide is present an active catalyst is obtained even with a Li/Ti ratio of 1/1. The best results in terms of productivity per gram of titanium per hour were obtained when the lithium to Nd ratio was at least 6.

EXAMPLE III

Still another series of experiments were conducted employing n-butyl lithium, neodymium chloride, and titanium tetrachloride. In these runs the gram atom ratio of Nd to Li was 10:1 and the ratio of the lithium alkyl to the neodymium was varied. The variations and results obtained are summarized in Table III.

TABLE III

| Run | mmol Ti | Li/Nd | Time (hr) | Yield (gm) | Kg PE/g Ti/hr |
|---|---|---|---|---|---|
| 18 | 0.02 | 3 | 0.08 | 4.78 | 60 |
| 19 | 0.02 | 3 | 0.25 | 22.14 | 92 |
| 20 | 0.02 | 3 | 0.50 | 44.46 | 93 |
| 21 | 0.02 | 3 | 1.0 | 115.11 | 120 |
| 22 | 0.10 | 1 | 0.25 | 28.02 | 23 |
| 23 | 0.10 | 2 | 0.25 | 34.73 | 29 |
| 24 | 0.10 | 6 | 0.25 | 47.17 | 39 |
| 25 | 0.10 | 9 | 0.5 | 30.26 | 13 |
| 26 | 0.05 | 30 | 0.5 | 13.50 | 11 |

The results in Table III demonstrate that the employment of a Nd/titanium ratio of about 10 generally gave better results in terms of productivity per gram of titanium than did the runs carried out as set forth in Example II. The best results were obtained using a catalyst system in which the lithium to Nd ratio was 3:1. The results obtained in this series of experiments is also summarized in FIG. 1 which shows that for the neodymium chloride butyl lithium, titanium tetrachloride catalyst system there is also a peak in productivity in the range of 20 to 60 lithium to titanium ratio. At a lithium to titanium ratio of about 30 the productivity of the system employing the rare earth metal halide was more than twice that of the catalyst system employing only n-butyl lithium and titanium tetrachloride.

EXAMPLE IV

The preparation of the rare earth metal halide catalyst system wherein the rare earth metal halide is reacted with n-butyl lithium produces a brown solution. The reaction, however, is not complete. A substantial amount of solid remains. When that heterogeneous mixture is treated with titanium tetrachloride, a dark brown-black solid catalyst results.

In an attempt to determine the nature of the catalyst, the reaction mixture resulting from the reaction of the rare earth metal halide and the butyl lithium was separated. The brown liquid was transferred to another catalyst tube. The solid was washed with toluene and then resuspended. Those two separate catalyst components were then each reacted with titanium tetrachloride and the ethylene polymerization activity of the two resulting products was studied. Although the exact lithium to titanium ratio is not known for these reactions, it appears that neither component of the mixture is as active as the combination. In other words, both the solid and the liquid parts resulting from the combination of the $NdCl_3$ and n-butyl lithium should preferably be present when contacted with the titanium tetrachloride. However, the catalyst formed from the brown liquid fraction is still more active than the catalyst resulting from the mere combination of titanium tetrachloride with n-butyl lithium at a ratio of butyl lithium to titanium tetrachloride of 30. It is assumed that this brown liquid fraction contains some sort of organo neodymium compounds. When solvent is removed from the brown solution, the resulting composition had 7. weight % neodymium.

EXAMPLE V

Figure 2:
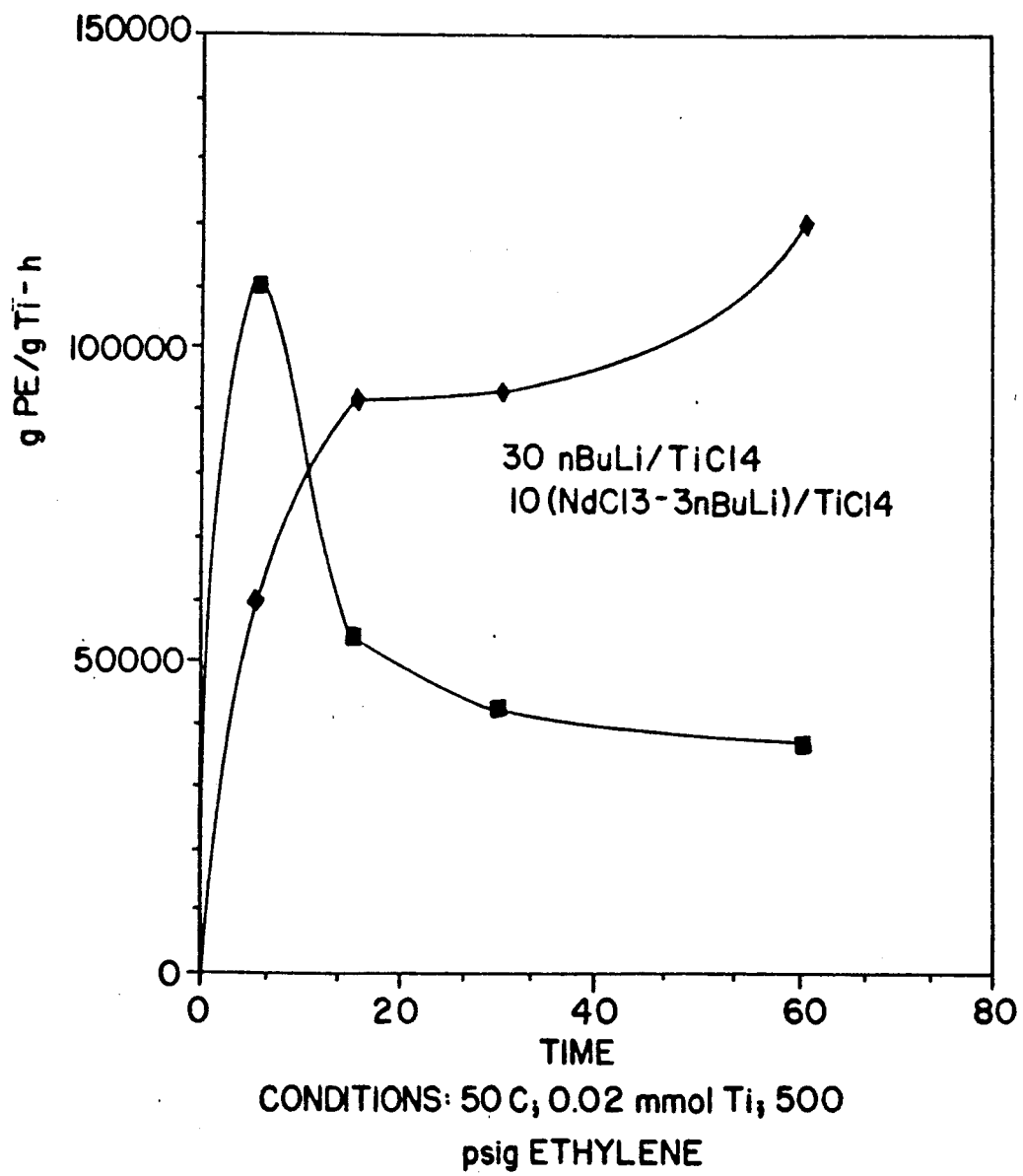

Studies were also carried out to compare the activity versus time for both the $10[NdCl_3.3\ nBuLi]/TiCl_4$ and the 30 $nBuLi/TiCl_4$. The results are presented graphically in FIG. 2. The catalyst that did not contain the rare earth metal peaked in activity early then decayed to a constant of approximately 50 kilograms of polyethylene per gram titanium.hour. The activity of the Nd-containing catalyst, on the other hand, rose slowly to an activity of about 90 to about 100 kilograms of polyethylene/gram titanium.hour after a period of about 15 minutes and then maintained that activity for at least about 1 hour.

The polyethylene prepared using the n-butyl lithium/titanium tetrachloride or the neodymium-containing catalyst was ultra high molecular weight (UHMW) with inherent viscosities in the range of 17 to 30. The density of the resins ranged from about 0.93 to about 0.95. No significant change in density or the molecular weight of the product was detected for reactions conducted above 50° C.

EXAMPLE VI

Another series of runs were conducted using hydrogen for both the neodinium-containing catalyst and the 30 $nBuLi/TiCl_4$ catalysts. The results are summarized in Table IV.

TABLE IV

The effect of $H_2$ on catalyst and on HLMI[8]
(Conditions: 50° C.; 0.5 h; 0.02 mmol Ti; 500 psig ethylene)

| Catalyst | $[H_2]^a$ | Activity (g PE/g Ti/hr) | HLMI |
|---|---|---|---|
| 30 $nBuLi/TiCl_4$ | 0 | 42,000 | 0 |
| 30 $nBuLi/TiCl_4$ | 4% | 24,000 | 0.030 |
| $10[NdCl_3.3\ nBuLi]/TiCl_4$ | 0 | 93,000 | 0 |
| $10[NdCl_3.3\ nBuLi]/TiCl_4$ | 4% | 36,000 | 0.015 |

$^a$concentration expressed as mole % (derived from partial pressures).

These results demonstrate that these catalysts are not affected to the same extent as are many of the transition metal based catalysts. That is to say the hydrogen does not appear to produce any substantial reduction in the molecular weight of the polymer.

EXAMPLE VII

Figure 3:
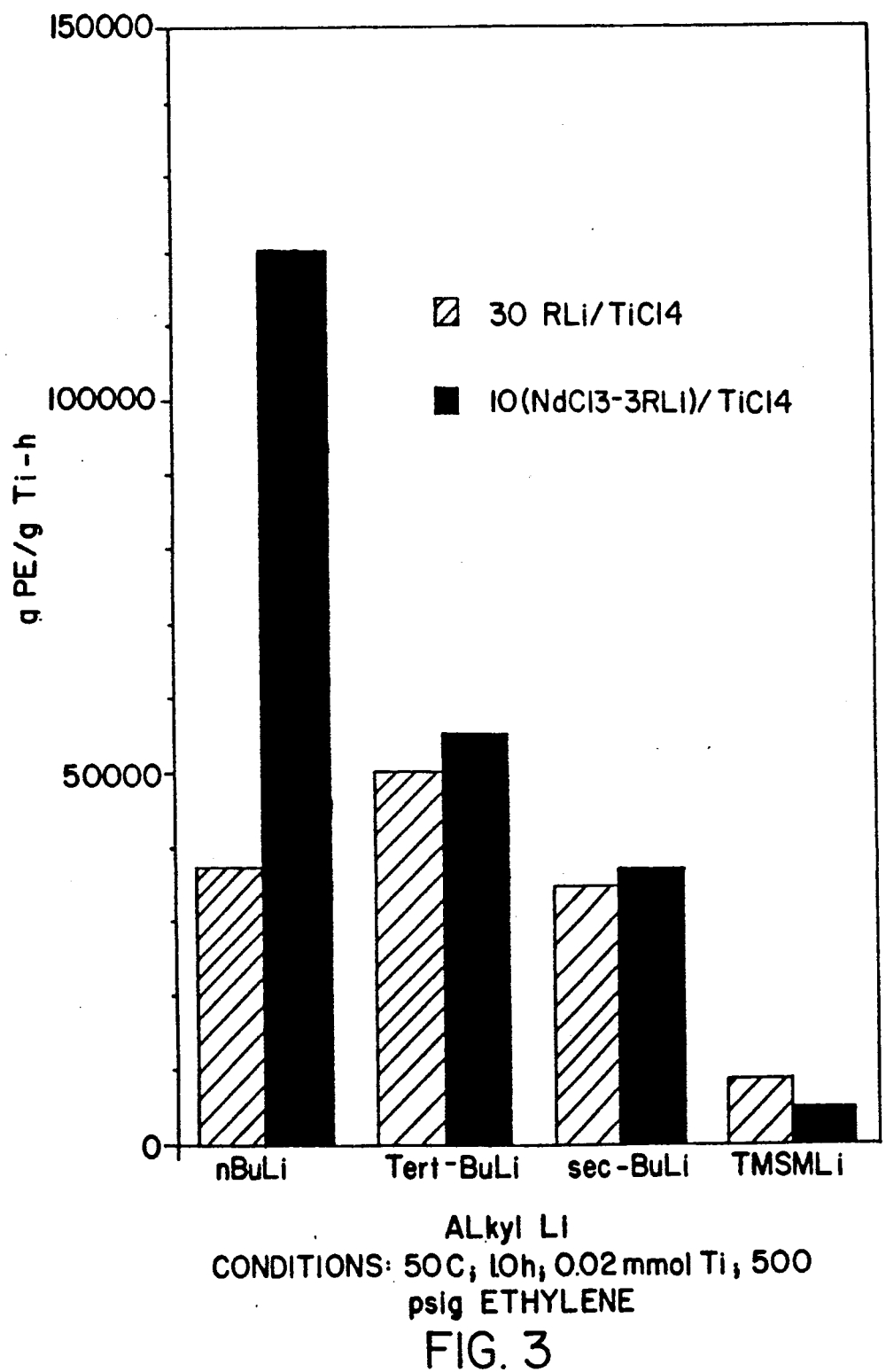

A series of runs were also conducted to evaluate the affect of different alkyl lithiums on the catalyst systems described herein. A comparison of the effects of the various alkyl lithiums is shown in FIG. 3. Also tetramethylsilylmethyllithium was tried.

FIG. 3 shows that in all cases the catalyst prepared using alkyl lithium and the neodymium chloride were more active than those produced using only the alkyl lithium. N-butyl lithium gave the best overall activity for the neodymium-containing catalyst. In contrast tertiary butyl lithium gave the best results for the 30 alkyl lithium/titanium tetrachloride catalysts. The tetramethylsilylmethyllithium gave results which were much less desirable than those obtained using the alkyl lithiums.

EXAMPLE VIII

Another series of experiments were conducted by contacting n-butyl lithium with neodymium chloride and then contacting the resulting mixture with zirconocene which is also known as dicyclopentadienyl zirconium dichloride. The variables and results obtained are summarized in Table V.

TABLE V

| Run* | NdCl$_3$ (mmol) | BuLi (mmol) | Cp$_2$ZrCl$_2$ (mmol) | Yield (gram) | g PE/g Zr/h |
|---|---|---|---|---|---|
| 27 | 1.6 | 4.8 | 0 | 6.55 | — |
| 28 | 1.0 | 3.0 | 1.0 | 2.03 | 4 |
| 29 | 1.6 | 4.8 | 0.16 | 46.80 | 530 |
| 30 | 2.0 | 6.0 | 0.02 | 36.08 | 3,300 |

*Polymerization conducted at 100° C. for 6 hrs.

The results show that the presence of the zirconium compound results in a more active catalyst. Further the higher Li/Nd ratios gave more active catalysts.

That which is claimed is:

1. An olefin polymerization catalyst prepared from reactants comprising titanium tetrachloride and an organolithium compound, wherein the gram atom ratio of lithium to titanium is in the range of about 20/1 to about 50/1.

2. A catalyst according to claim 1 prepared by combining titanium tetrachloride with said organolithium compound.

3. A catalyst according to claim 2 prepared by combining titanium tetrachloride and said organolithium compound in a suitable liquid diluent.

4. A catalyst according to claim 3 wherein said organolithium compound is an alkyl lithium in which the alkyl group contains 2 to 6 carbon atoms.

5. A catalyst according to claim 3 wherein said organolithium compound is selected from butyl lithium compounds.

6. A catalyst according to claim 3 wherein said organolithium compound consists essentially of n-butyl lithium.

7. A catalyst according to claim 6 wherein the gram atom ratio of lithium to titanium is in the range of about 20 to about 35.

8. A catalyst according to claim 3 wherein the gram atom ratio of lithium to titanium is in the range of about 20 to about 35.

9. A catalyst according to claim 8 wherein said organolithium compound consists essentially of tert-butyl lithium.

* * * * *